United States Patent [19]

Lippold

[11] Patent Number: 5,290,447
[45] Date of Patent: Mar. 1, 1994

[54] BLOCK-SHAPED PLEATED FILTER INSERT

[76] Inventor: Hans-Joachim Lippold, Wredeweg 8, W-1000 Berlin 22, Fed. Rep. of Germany

[21] Appl. No.: 917,130
[22] PCT Filed: Feb. 8, 1991
[86] PCT No.: PCT/DE91/00111
§ 371 Date: Aug. 10, 1992
§ 102(e) Date: Aug. 10, 1992
[87] PCT Pub. No.: WO91/12068
PCT Pub. Date: Aug. 22, 1991

[30] Foreign Application Priority Data

Feb. 8, 1990 [DE] Fed. Rep. of Germany ....... 4004079

[51] Int. Cl.$^5$ .............................................. B01D 27/06
[52] U.S. Cl. .............................. 210/493.1; 210/493.3; 210/493.5; 55/475; 55/500; 55/521
[58] Field of Search ............. 210/493.1, 493.5, 493.3, 210/321.84; 55/475, 497, 500, 521

[56] References Cited

U.S. PATENT DOCUMENTS

| | | | |
|---|---|---|---|
| 3,531,920 | 10/1970 | Hart . | |
| 3,799,354 | 3/1974 | Buckman et al. | 210/493.1 |
| 3,849,314 | 11/1974 | Niccum et al. | 210/493.5 |
| 4,268,290 | 5/1981 | Barrington . | |
| 5,028,331 | 7/1991 | Lippold | 210/493.5 |
| 5,053,131 | 10/1991 | Lippold | 210/493.5 |
| 5,066,400 | 11/1991 | Rocklitz et al. | 210/493.5 |
| 5,071,555 | 12/1991 | Enbom | 210/453.5 |

Primary Examiner—Robert A. Dawson
Assistant Examiner—W. L. Walker
Attorney, Agent, or Firm—Spencer, Frank & Schneider

[57] ABSTRACT

A filter insert having a block-shaped configuration comprises a planar material that is permeable to a medium and is arranged as a plurality of pleats having pleat walls. Each pleat wall has opposing first and second edges. The pleat walls are arranged in a zigzag pattern presenting first and second edge sections wherein a medium to be filtered passes through the filter insert in a direction from the first edge section toward the second edge section. The pleat walls have embossed projections which are parallel to one another and project with a height in a direction toward an adjacent pleat wall. The projections have length in a direction from one edge to an opposite edge of a respective pleat wall and a width perpendicular to the length. The width is essentially constant over the length and the length exceeds the width. Adjacent projections of adjacent pleat walls contact one another for securing, spacing and stiffening the pleats and the filter insert. The first edges of every other pair of adjacent pleat walls and the second edges of a different every other pair of adjacent pleat walls are connected to one another by respective planar intermediate regions of the filter material at least in areas of the pleat walls exterior of the projections. The heights of the adjacent projections of the pairs of adjacent pleat walls connected at the first edge section increase in a direction toward the second edge section and the heights of the adjacent projections of the pairs of adjacent pleat walls connected at the second edge section increase in a direction toward the first edge section.

14 Claims, 6 Drawing Sheets

BLOCK-SHAPED PLEATED FILTER INSERT

BACKGROUND OF THE INVENTION

The invention relates to a filter insert having a blocked shape configuration.

A filter insert disclosed in U.S. Pat. No. 3,531,920 has a block shape and is composed of a filter element that is pleated in a zigzag pattern. Mutually parallel dimples project from the pleat walls, with the dimples projecting from the plane of the pleat walls on both sides of the pleat walls and the dimples of adjacent pleat walls lying against one another at their contacting faces. Each one of the dimples extending perpendicularly to the edges of the zigzag pleats forming the crease has a height that gradually increases and decreases in the direction of movement of the medium and a width that increases in the direction of increasing height. Each pair of dimples that are adjacent within the pleat wall extend in mutually opposite directions with respect to the plane of the pleat wall; they are thus embossed to be raised and recessed, respectively.

The dimples are here arranged in such a way that each raised dimple in the pleat wall has an associated likewise raised, embossed dimple in the adjacent pleat wall in such a way that the zigzag pleat causes the associated dimples to lie on top of one another and to support one another in the region of their contacting faces.

In this way a space is ensured between the adjacent pleat walls which uniformly decreases in the direction of movement of the medium and uniformly increases after passage of the medium through the wall.

The drawback is here that the width of the dimples increases and decreases in the direction of movement of the medium so that the direction of flow of the medium to be filtered is deflected laterally. This increases flow resistance and requires greater conveying power for the medium to be filtered. With the increasing width of the dimples, the surface area available in the region of the wall for passage of the medium to be filtered is also reduced.

Moreover, the width of a channel for the medium formed between two adjacent dimples increases in the direction of movement of the medium. The change in cross section caused thereby additionally increases flow resistance in an undesirable manner. In order, to make the filtering of large quantities of a medium economically feasible, the energy to be made available for the filtering process should be as low as possible, particularly since the corresponding drive means generate more noise with increasing power.

SUMMARY OF THE INVENTION

It is an object of the invention to reduce the flow resistance as much as possible in a filter insert of the above mentioned type, with high stability of the arrangement being ensured in spite of a simple configuration.

This is accomplished by a filter insert having a block-shaped configuration, comprising:

a planar material which is permeable to a medium and is arranged as a plurality of pleats having pleat walls, each pleat wall defining a plane and having opposing first and second edges, the pleat walls being arranged in a zigzag pattern presenting first and second edge sections wherein a medium to be filtered passes through the filter insert in a direction from the first edge section toward the second edge section, the pleat walls having embossed projections which are parallel to one another and project with a height with respect to the plane of the pleat wall an in a direction toward an adjacent pleat wall, the projections having a length in a direction from one edge to the opposite edge of a respective pleat wall and a width perpendicular to the length, the width being essentially constant over the entire length, and the length exceeding the width, wherein adjacent projection of adjacent pleat walls contact one another for securing, spacing and stiffening the pleats and the filter insert, and the planar material is further arranged so the first edges of every other pair of adjacent pleat walls and the second edges of a different every other pair of adjacent pleat walls are connected to one another by respective planar intermediate regions of the filter material at least in areas of the pleat wall exterior of the projections, and the heights of the adjacent projections of the pairs of adjacent pleat walls connected at the first edge section increase in a direction toward the second edge section and the heights of the adjacent projections of the pairs of adjacent pleat walls connected at the second edge section increase in a direction toward the first edge section.

The invention is based on the realization that the transporting path for the medium to be filtered, on the one hand, should be as short and straight as possible and, on the other hand, the change in cross section of a channel through which the medium passes should always be equal to the surface area of the filter material available in the course of this change in cross section for the passage of the medium. In this way it is ensured that, if the flow as a whole is laminar, the entire surface area of the filter material is utilized uniformly and no pressure fluctuations occur along the transporting path for the medium to undesirably increase flow resistance. The separation is made more uniform and, in spite of a greater degree of separation, the service life of the filters is extended.

It is furthermore of particular advantage here that the pleated edges are given a trapezoidally broadened configuration. This additionally homogenizes the pressure distribution; in particular, the height of the pleat wall can thus be designed to be greater than in the past without creating disadvantageously high pressure differences during passage of the medium to be filtered in the region of the passage area of the filter material. These slight pressure differences are also caused, in particular, by the slight accumulation of material in the region of the pleated edge and by the possibility that, in this region, the medium to be filtered has available a larger filter area. Moreover, the laminar flow, which is favorable for the filtering process, remains in effect. The greater height of the pleat walls not only increases the surface area of the filter, it also improves the filter characteristics as a whole, particularly the degree of separation. The broadened configuration of the pleat edge having the greater height also results in a significantly more favorable ratio of pressure difference to pleat height. This produces greater stability and an increased service life for the respective filter insert.

In a preferred embodiment, the width is greater than the height of the maximum points of the raised portions with respect to the plane of the pleat wall. The ratio of the pressure difference to pleat height has been found to be particularly favorable with such geometrical relationships.

The transition region from the end of the projection that is at the greatest distance from the plane of the pleat wall into the plane of the pleat wall has a configuration that is favorable for flow conditions, with initially a region of greater steepness being arranged between regions of less steepness. In addition, the regions of less steepness, in particular, change continuously into the adjacent planar regions. The pressure differences for the medium to be filtered becomes smaller in the passage region of the filter material and the flow becomes approximately laminar.

In an advantageous embodiment, the width of the channels is large in relation to the webs formed by the projections so that a favorable ratio can be realized between the effective filter surface area and the total surface area of the pleat walls.

In this way, block-shaped filter inserts can be produced as disposable items which can be manufactured economically and have a long service life. The filter walls made of a non-woven material need not be provided with solid spacers or stiffening reinforcements.

In advantageous modifications of the invention, a hardenable coating and/or saturation is provided in order, in particular, to reinforce the projections, thus additionally augmenting the rigidity of the arrangement, with the coating or saturation extending to the side walls of the projections since these pleat walls form stiffening "ribs".

It appears to be particularly favorable to reinforce the local thickness of the coating and the intensity of the saturation, respectively, with increasing distance of the raised portion of the projections from the plane of the pleat wall since this correspondingly strengthens and stabilizes the tapering walls of the projections formed by the embossing. Preferably the coating or saturation is composed of a hardenable adhesive material.

BRIEF DESCRIPTION OF THE DRAWINGS

Other advantageous features of the inventions [sic] are disclosed in the dependent claims and will now be described in greater detail together with a description of the preferred embodiments of the invention and the drawing figures, in which:

DETAILED DESCRIPTION OF THE INVENTION

Figure 1:
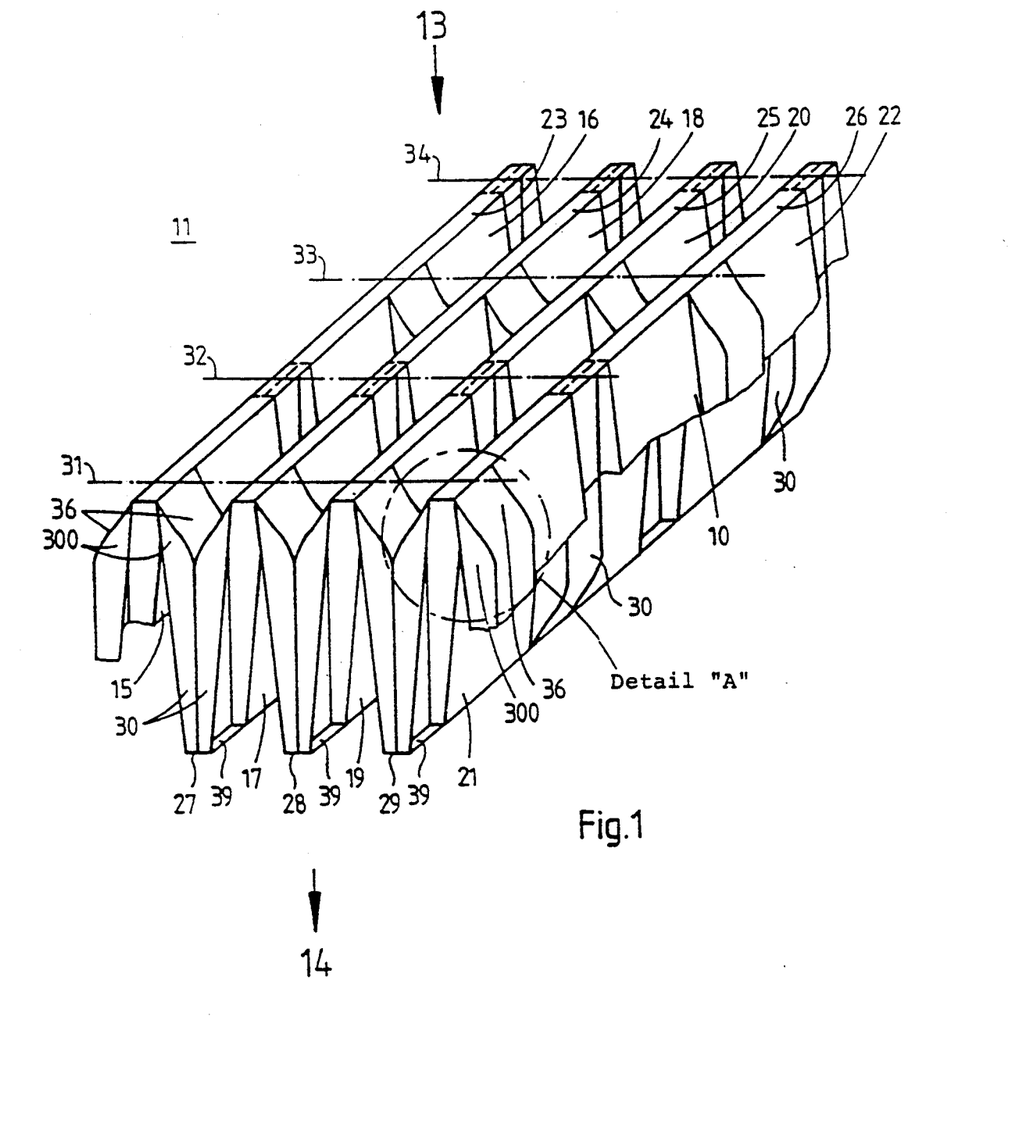
FIG. 1 is a perspective view of part of an embodiment of the filter material according to the invention.
Figure 4:
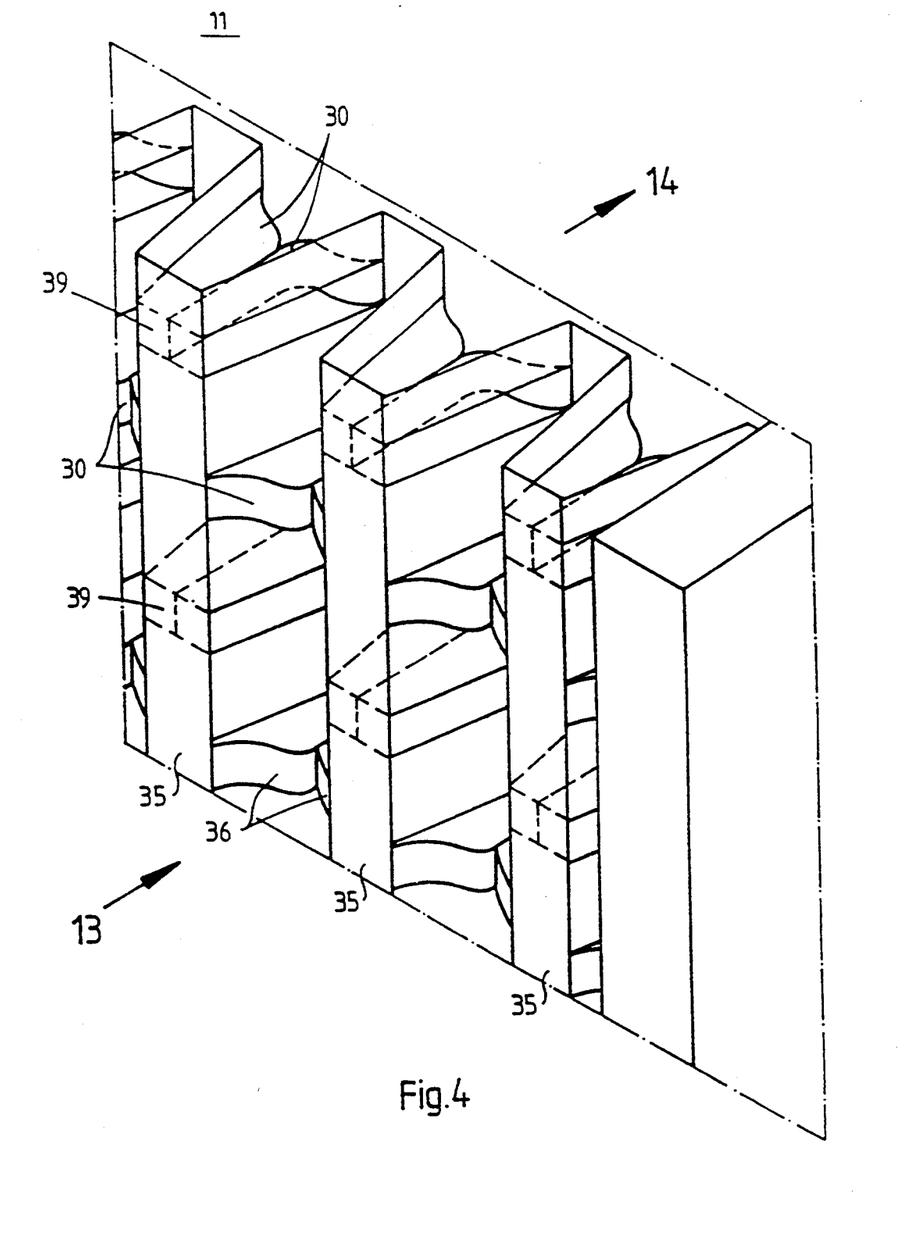
FIG. 4 is a perspective top view of the embodiment that has been pleated into a filter insert.

FIGS. 1 and 4 each show a section of a filter material 10 composed of a non-woven filter material that is shaped into an essentially block-shaped filter insert 11 by zigzag pleating. This non-woven filter material is, in particular, a non-woven submicron particulate filter material. In principle, any filter material that can be shaped accordingly is suitable.

The block shaped filter insert 11 fits in a known manner into a frame 12 that additionally stabilizes the filter insert. Depending on its application, the filter insert may also be constructed without a frame in which case the external dimensions are adapted to the recess provided for the filter insert in the appropriate receptacle. The medium to be filtered flows from the entrance side 13 through the filter insert, from where the flowing medium passes through the filter material in the direction of an oppositely disposed exit side 14 from where it is extracted through a suitable discharge conduit or flows out freely.

In FIG. 1, the filter material 10 is pleated in a zigzag shape, with a number of pleat walls 15 to 22 each forming a pleat. Pleat walls 15 and 16 are connected with one another by way of a trapezoid-like broadened pleat edge 23 on the entrance side 13 against which the medium flows. Likewise, pleat walls 17 and 18 are connected with one another by a broadened pleat edge 24, pleat walls 19 and 20 by a broadened pleat edge 25 and pleat walls 21 and 22 by a broadened pleat edge 26.

Pleat edges 27, 28 and 29 at the exit side 14 are also broadened in the manner of a trapezoid, with pleat walls 16 and 17 being connected with one another by pleat edge 27, pleat walls 18 and 19 by pleat edge 28 and pleat walls 20 and 21 by pleat edge 29. These broadened pleat edges together with this type of pleating enlarge the filter insert surface area, homogenize the pressure distribution and increase the degree of separation of filter insert 11. This improvement results from an optimization of the velocity distribution, a reduction in the pressure difference and a reduction in the accumulation of material in the region of the pleat edges. Thus, the pleat walls may be higher than the conventional filters. The service life of such filters is also longer.

Pleat walls 15 to 22 are provided with projections 30 of the same material which are formed by embossing the filter material (non-woven submicron particulate filter material). Projections 30 have a constant width in the direction of movement of the medium to be filtered. Side walls 300 of projections 30 extend perpendicularly to the broadened pleat edges 23 to 29 that connect pleat walls 15 to 22 with one another. Starting from the broadened pleat edges 27 to 29, projections 30 here increase in height with respect to the plane of pleat walls 15 to 22 in the direction toward the broadened pleat edges 23 to 26.

The contact region is configured in the form of a rectangular contact surface on projections 30. This increases the stability of the filter insert. By embossing pleat walls 15 to 22, the surface of the filter element has been enlarged correspondingly and the additional material required was taken from the pleat wall to be embossed in the embossing process. Thus the walls of projections 30 are correspondingly thinner. The applied adhesive additionally strengthens this region in particular so that the weakening of material caused by the deformation has been eliminated or, depending on the amount of adhesive applied, overcompensated.

The projections 30 of adjacent pleat walls 15 to 22 lie against one another to secure the spacing and for stiffening. For example, the mutually contacting projections 30 of two pleat walls 16 and 17 that are connected together by way of a broadened pleat edge 27 are given an increasing height with respect to the respective pleat wall 16 or 17 in the direction toward the respectively oppositely disposed broadened pleat edges 23 and 24 so that between these pleat walls 16 and 17 a distance is fixed which decreases in the direction of movement of the medium and increases after passage of the medium through the respective pleat wall 16 or 17. In this way, it is ensured that, if the overall flow is laminar, the entire surface area of the filter material is utilized uniformly and no pressure fluctuations which would undesirably increase flow resistance occur along the transporting path of the medium.

Projections 30 are arranged along equidistant straight lines 31 to 34. The projections here alternatingly project from sides 13 and 14 in such a way that projections 30 project on straight lines 31 and 33 from entrance side 13 and the further projections 30, which are disposed along straight lines 32 and 34, project from the exit side 14. This alternating arrangement of projections 30 increases stability since the pleat walls are held at a predetermined mutual spacing on the entrance side 13 as well as on the exit side 14. Projections 30 change back to the pleat wall at both ends. The transition region 36 at the end of that projection 30 which is at the greatest distance from the plane of pleat wall 22 will be described in detail in connection with FIG. 2. The other transition region 39 at the end of projection 30 which is at the shortest distance from the plane of pleat wall 21 may either be configured as a recess or as a material covered surface. In this case, transition region 39 is shown as a material covered vertical surface. In the pleated state, this surface lies against the broadened pleat edge 29 and is in flush or linear contact with the projection 30 of the adjacent pleat wall 20. The projection 30 of the adjacent pleat wall 20 is configured as a vertical, material covered surface also in the transition region 39 and also lies against the broadened pleat edge 29. Transition region 39 in the form of a recess or a material covered surface may additionally be sloped or rounded.

Figure 2:
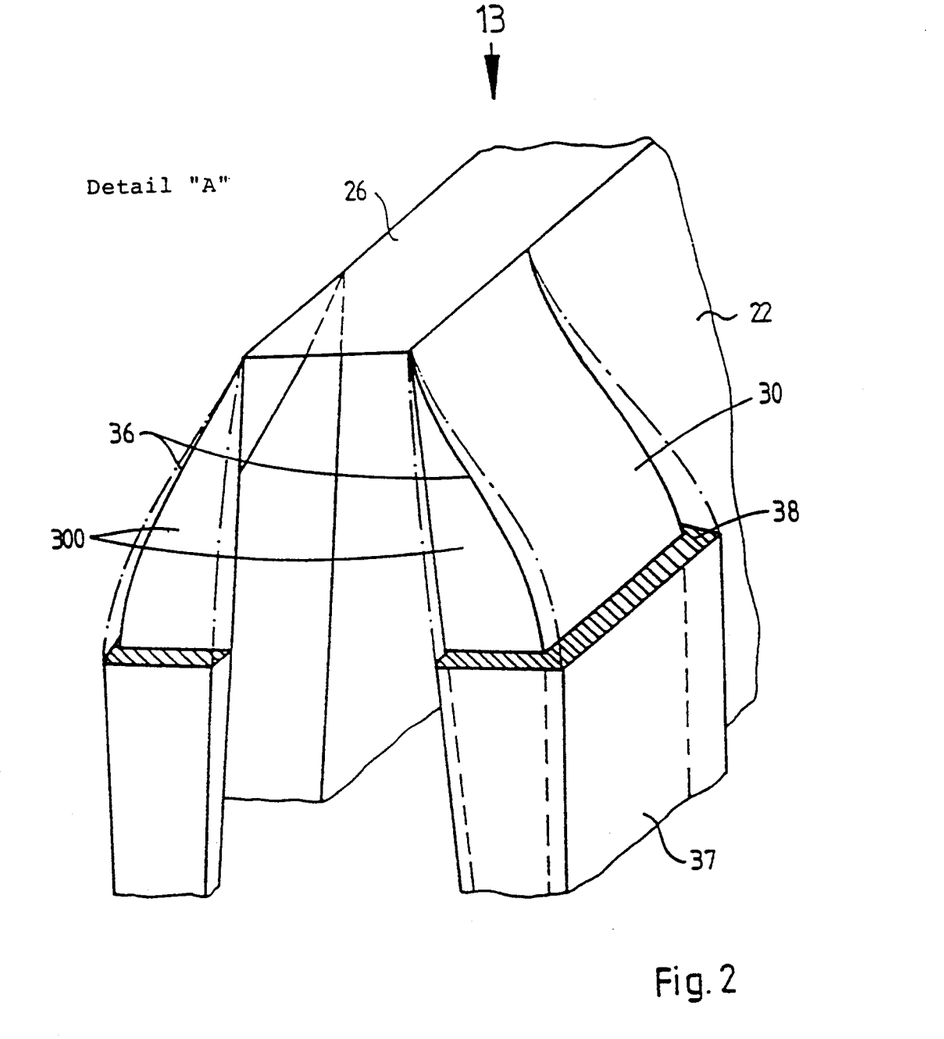
FIG. 2 is a sectional view of a detail A as an enlarged partial view of FIG. 1.

The enlarged sectional detail A of FIG. 1 shown in FIG. 2 depicts a transition region 36 from the trapezoid-like broadened pleat edge 26 to the projection 30 that projects from pleat wall 22.

The region of transition 36 extends from that end of projection 30 which is at the greatest distance from the plane of the pleat wall in the direction toward pleat edge 35 and into the plane of pleat wall 22. Transition region 36 here includes a region of greater steepness which is disposed between two regions of a less steep steepness. In particular, the regions of a less steep slope change continuously into adjacent planar regions. A rectangular surface 37 is part of the contact surface of adjacent contacting projections 30 of the pleat walls. Transition regions 36 are given a configuration that enhances flow so that flow resistance caused, among others, by the projections, is reduced.

Above projection 30 and transition region 36, there is disposed a hardenable adhesive coating 38 which stiffens projection 30 and transition region 36 and which is shown broken open at the end of projection 30 in the direction toward pleat edge 35 in order to better show the configuration and arrangement of the individual structural elements. Adhesive coating 38 may selectively also be configured as a saturation 38.

Adhesive coating 38 also extends to side walls 300 of projections 30 and of transition region 36. The local thickness of adhesive layer 38 here increases with the distance of the raised portion of projections 30 from those of pleat wall 22. In that way, the decreasing wall thickness of projections 30 caused by the embossing, and thus also the decreasing stability of projections 30, is compensated by the hardenable adhesive layer 38 that stiffens the projections. The adhesive coating 38 gives the projections the strength and stability required for the filtration process.

The applied adhesive coating 38 glues the adjacent, abutting projections 30 together. This stabilizes filter insert 11 and simultaneously makes its block shape self-supporting, without an additional frame. This considerably simplifies installation of the filter inserts 11 into the prior art filter housings 12.

Figure 3:
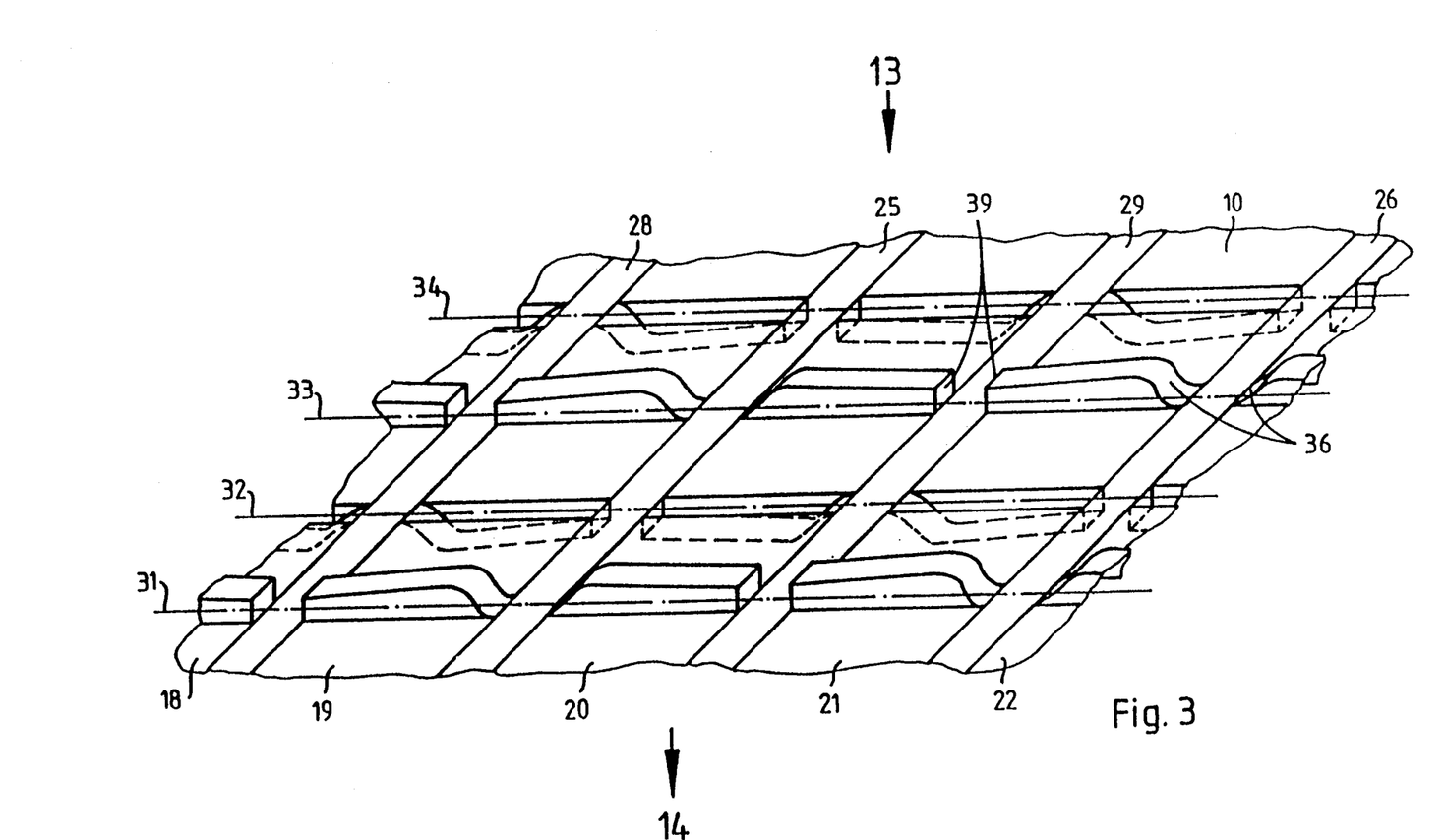
FIG. 3 is a perspective view of part of the filter element in the non-pleated state.

FIG. 3 is a perspective view of part of the filter material 10 in the non-pleated state.

Projections 30 that alternatingly project from entrance side 13 and from exit side 14 can be seen.

Projections 30 are embossed by means of two rolls that are arranged on both sides of filter material 10, which are not visible here. The filter material 10 moves through the embossing rollers in the form of a sheet. This produces continuous stamped projections 30 on straight lines 31 to 34 with corresponding transition regions 36 and 39 and pleat edges 24 to 27 that are broadened in the form of a trapezoid. Thereafter, filter element 10 again moves through rolls disposed on both sides of filter material 10, which are not visible and which at their roll walls are provided with hollow shapes adapted to the shape of the embossed projections 30. The hardenable adhesive coating 38 is applied in this rolling process to projections 30 and their side walls 300. The embossing of projections 30 by rolling is an economical way for the production of filter elements 10, and the application of the hardenable adhesive coating 38 is effected by rolling as well in a manner that is advantageous from a manufacturing point of view.

FIG. 4 is a sectional view of a filter insert 11. Behind the broadened pleat edges 35, the transition regions 39 of projections 30 can be seen in dashed lines. The broadened pleat edges 35 have such dimensions that they are each able to accommodate two transition regions 39 of projections 30 in the pleated state. Transition regions 36 of the projections 30 that project on entrance side 13 change in a flow enhancing way into the broadened pleat edge 35. With this configuration of projections 30, filter insert 11 exhibits little flow resistance and is very stable.

Figure 5:
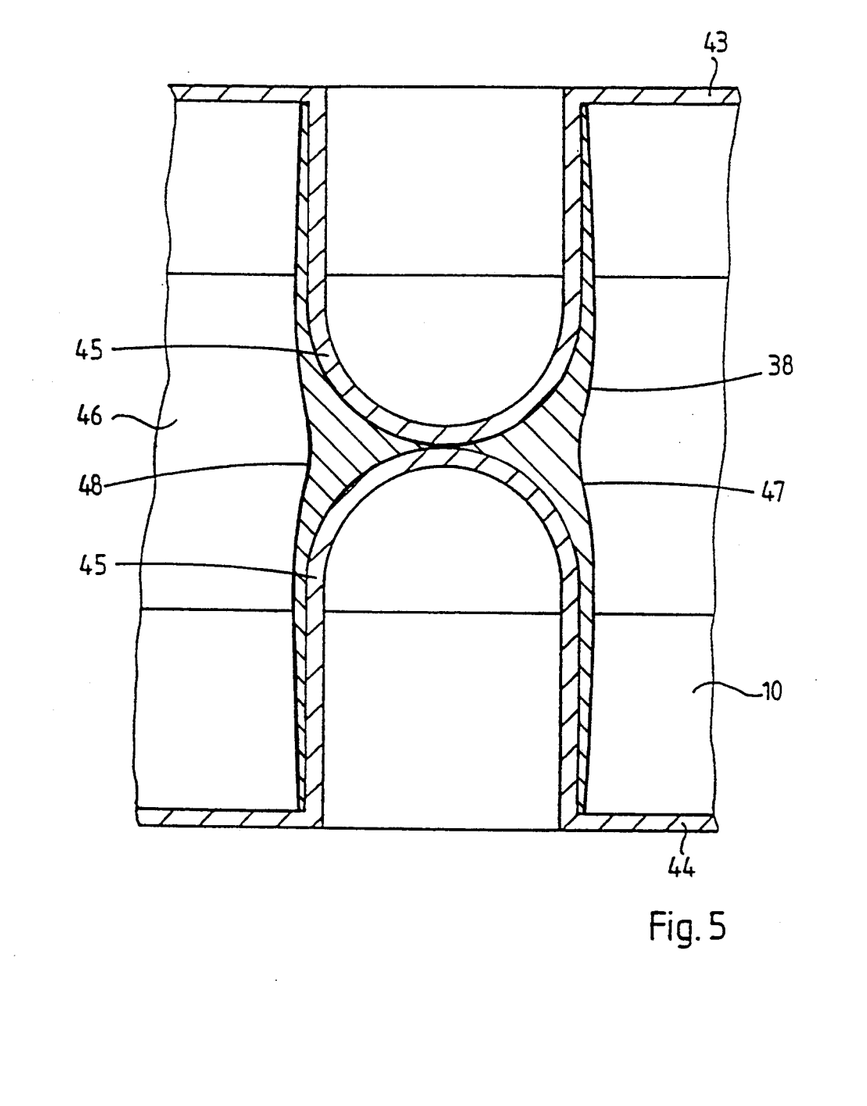
FIG. 5 is an enlarged cross-sectional view of two mutually contacting projections of pleat walls which are glued together.
Figure 5A:
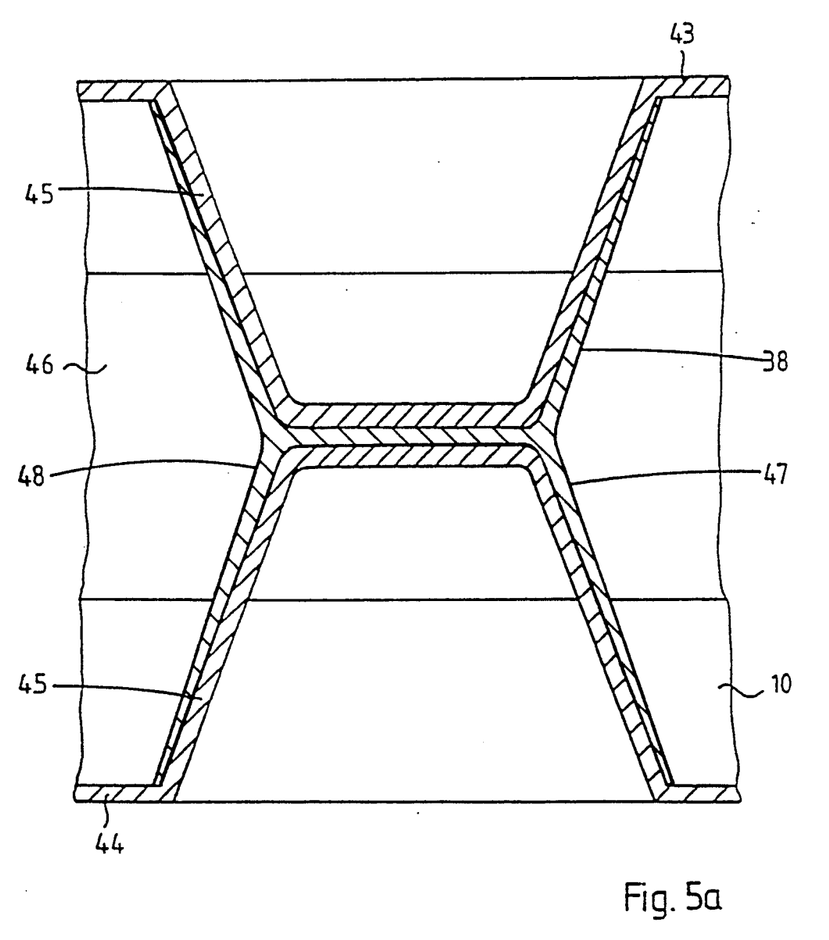
FIG. 5a is a cross-sectional view of a second embodiment to FIG. 5.

FIGS. 5 to 5a are enlarged cross-sectional views of two different embodiments of two abutting projections 45 that are embossed into pleat walls 43 and 44. Starting from a broadened pleat edge 46, projections 45 are configured so that their height increases relative to the respective plane of pleat walls 43 and 44 in the direction toward the oppositely disposed broadened pleat edge which is not visible here. The width of projections 45 is constant. Projections 45 essentially have the characteristics of the already described projections 30. The difference, however, lies in the respective shaping of projections 45. FIG. 5 shows a round embodiment and FIG. 5a a trapezoidal embodiment of two abutting projections. In the preferred embodiment of the trapezoidal projections 30, the width of projections 30 is greater than the height of the maximum raised portions of projections 30 relative to the respective planes of pleat walls 43 and 44.

In both embodiments, the local thickness of adhesive coating 38 increases with the distance of the raised portion of projections 45 relative to the respective pleat walls 43 and 44. As shown for the projections of FIG. 5, projections 45 contact one another in a line and, according to FIG. 5a, in an areal contact. For the linear contact, adhesive coating 38 is placed at the side of the contact line when projections 45 are pressed against one another so that adhesive coating 38 forms flow enhancing side walls 47 and 48. With this configuration of the adhesive coating, filter insert 11 is stabilized so that the distance between straight lines 31 to 34 on which projections 30 and 45 are disposed, respectively, is increased. Because of the flow enhancing side walls 47 and 48, the medium to be filtered has a laminar flow. The flow resistance is likewise reduced by a lower number of projections and this also reduces the energy required for extraction and pressing through.

The invention is not limited in its embodiments to the above-described preferred exemplary embodiment. Rather, a number of variations are conceivable which take advantage of the described solution even for basically different configurations.

I claim:

1. A filter insert having a block-shaped configuration, comprising:
    a planar material which is permeable to a medium and is arranged as a plurality of pleats having pleat walls, each said pleat wall defining a plane and having opposing first and second edges, said pleat walls being arranged in a zigzag pattern presenting first and second edge sections wherein a medium to be filtered passes through the filter insert in a direction from the first edge section toward the second edge section, said pleat walls having embossed projections which are parallel to one another and project with a height with respect to the plane of the pleat wall and in a direction toward an adjacent pleat wall, said projections having a length in a direction from one edge to the opposite edge of a respective pleat wall and a width perpendicular to the length, the width being essentially constant over the entire length, and the length exceeding the width, wherein adjacent projections of adjacent pleat walls contact one another for securing, spacing and stiffening the pleats and the filter insert, and said planar material is further arranged so the first edges of every other pair of adjacent pleat walls and the second edges of a different every other pair of adjacent pleat walls are connected to one another by respective planar intermediate regions of said filter material at least in areas of said pleat walls exterior of the projections, and the heights of the adjacent projections of said pairs of adjacent pleat walls connected at the first edge section increase in a direction toward the second edge section and the heights of the adjacent projections of said pairs of adjacent pleat walls connected at the second edge section increase in a direction toward the first edge section.

2. Filter insert according to claim 1, wherein the respective projections each have a first transition region on an end of the projection which is less high in relation to the pleat wall and said first transition region includes a recess.

3. Filter insert according to claim 1, wherein the respective projections each have a first transition region on an end of the projection which is less high in relation to the pleat wall and said first transition region is comprised of the filter material.

4. Filter insert according to 1, wherein the respective projections each have a first transition region on an end of the projection which is less high in relation to the pleat wall and said first transition region stand essentially perpendicular to the to the pleat wall.

5. A filter insert according to claim 1, wherein the respective projections each have a first transition region on an end of the projection which is less high in relation to the pleat wall and said first transition region is essentially sloped or rounded with an angle less than 90° to the plane of the pleat wall below the projections and extend into a plane of the pleat wall.

6. Filter insert according to claim 1, wherein said pleat walls each have opposite surfaces and said projections project alternately from the opposite surfaces of each pleat wall.

7. Filter insert according to claim 1, wherein the width of each said projection is greater than the maximal height of said projection.

8. Filter insert according to claim 1, said projections each have a second transition region at an end of said projection which has a greater height in relation to the plane of the respective pleat wall, said second transition region having a region of greater incline between regions of lesser incline, with the region of lesser incline continuously changing into adjacent planar regions.

9. A filter insert according to claim 1, the projections of mutually adjacent walls contact one another in planar regions and further including adhesive being applied in the planar regions of contact.

10. Filter insert according to claim 1, wherein said projections each have side walls extending perpendicular to said the edges of said pleat walls.

11. A filter insert according to claim 8, further comprising one of a hardenable coating or saturation applied to said projections and extending to the side walls of said projections for stiffening said projections.

12. A filter insert according to claim 11, wherein the local thickness of the coating or the intensity of the saturation, respectively, increases with the height of the respective projection relative to the plane of the pleat wall.

13. A filter insert according to claim 11, wherein the coating or saturation, respectively, comprises an adhesive material, with said adjacent projections which contact one another being glued to one another.

14. A filter insert according to claim 1, wherein the pleat walls are equally long between the first and second edges.

* * * * *